Patented July 17, 1951

2,560,889

UNITED STATES PATENT OFFICE 2,560,889

RECOVERY OF STREPTOMYCIN FROM ORANGE II SALT

Peter P. Regna, Woodcliff, N. J., and Isaiah A. Solomons, III, Jackson Heights, N. Y., assignors to Chas. Pfizer & Co., Inc., Brooklyn, N. Y., a corporation of New Jersey No Drawing. Application May 7, 1947, Serial No. 746,633

7 Claims. (Cl. 260—210)

This invention relates to the recovery of streptomycin from complex salts thereof, and it has for its object to provide a novel and improved process for this purpose.

Another object of the invention is to provide an efficient and economical method of separating streptomycin salts of high antibiotic activity from streptomycin dye salts.

Still another object is to separate streptomycin salts of high antibiotic activity from streptomycin-Orange II salts which may be precipitated directly from crude aqueous solutions of streptomycin, such as fermentation broths.

Various other objects and advantages will be apparent as the nature of the invention is more fully disclosed.

Streptomycin, an antibiotic produced by fermentation from selected strains of cultures of *streptomyces griseus*, is a highly potent antibacterial agent which is effective against a wide variety of pathogenic organisms. Clinical indications for the use of streptomycin have been observed in urinary tract infections due to gram negative microorganisms, influenza bacillus meningitis, tracheobronchitis and pneumonia, tularemia, ophthalmic infections due to Ps. pyocaneus, peritonitis due to gram negative organisms, and certain gram negative bacillary infections. Promising results have been obtained also in studies of tuberculosis.

It is known to adsorb streptomycin or its salts from solutions upon activated carbon, and to elute it therefrom with solvents adjusted to a pH below neutral, but this procedure yields streptomycin along with much extraneous material since many other substances are simultaneously adsorbed and eluted. For this reason this method gives a product of low potency. It is also possible to prepare streptomycin concentrates by adsorption on zeolite or ion-exchange resins. However, in removing the streptomycin from these adsorbents by sodium or potassium chlorides, the streptomycin becomes contaminated with considerable amounts of these salts which are difficult to remove, and even after separation of the inorganic salts gives concentrates with a low streptomycin potency.

In our copending application, Serial No. 743,206, filed April 22, 1947, we have disclosed that streptomycin is almost quantitatively precipitated from fermentation broths, in the form of a dye salt, by combining the streptomycin in the growth medium with sodium p-(2-hydroxy-1-naphthylazo)-benzene sulfonate, a dye which is also known as Orange II (Color Index #151).

The present invention relates to a method of recovering streptomycin salts of high antibiotic activity from streptomycin salts of β-p-(2-hydroxy-1-naphthpyazo)-benzene sulfonic acid, which comprises mixing said dye salt with a liquid which is a solvent for amine salts of the dye, and reacting said mixture with an amine salt to precipitate a sulfate or other salt of streptomycin and leave the amine salt of β-p-(2-hydroxy-1-naphthylazo)-benzene sulfonic acid in solution.

A preferred method of converting streptomycin-Orange II into its two components, according to the present invention, is to suspend the streptomycin-Orange II in alcohols, ethers of ethylene glycol ("cellosolves"), and mixtures of water acetone, water-alcohols and water-"cellosolves." To the mixture is then added an amine salt such as triethylamine sulfate. After sufficient shaking or stirring, the precipitated streptomycin sulfate is removed by filtration, thus leaving the triethylamine-Orange II salt in the methanol solution. However, any soluble amine sulfate may be employed in the precipitation; conditions being that both the amine sulfate, and the amine salt of the dye, are soluble in alcohol, water or mixtures of the aforementioned solvents. These conditions are realized by a number of amines, such as, for example, dimethylaniline, diethylaniline, ethylamine, triethylamine, quinoline, pyridine, ethanolamine, etc. In addition to the amine sulfates, the streptomycin can be precipitated from solutions of streptomycin-Orange II by other amine salts, such as amine phosphates, mucates, tartrates, oxalates, citrates, or other organic and inorganic acids which produce alcohol insoluble streptomycin salts and soluble amine Orange II salts.

Other break-up procedures in which the streptomycin-Orange II salt is first partially dissolved in acetone-water mixtures, methanol-water mixtures and other solvent mixtures, such as water-propanol, water-"methyl cellosolve," etc. take place, as described in the examples below. The conditions and situations described herein prevail on streptomycin-Orange II salt which has been obtained from fermentation broths, from eluates of adsorbents, and from solutions of partially purified streptomycin.

The microbiological assays on the streptomycin were carried out using *Escherichia coli* and *Bacillus subtilis* similar to those employed for penicillin assays. The *B. subtilis* plate assay is carried out by the method of Schmidt and Moyer (J. Bact., vol. 47, p. 199 (1944), and the E. coli turbidimetric assay by the procedure of McMahan (J. Biol. Chem., vol. 153, p. 249 (1944)).

Example 1

Fifty liters of a filtered streptomycin fermentation broth (140 mcg./ml.) was adjusted to pH 5.5 with sulfuric acid and to it was added 350 g. of "supercel" (a diatomaceous earth filter aid), (the larger amount of filter aid is not necessary for purposes of aiding the filtration, but is a means of keeping the precipitate well-dispersed in the subsequent conversion of the streptomycin-Orange II salt to streptomycin trihydrochloride) and 65 g. of Orange II. The mixture was stirred for one-half hour, filtered and the filtrate, containing 10 mcg./ml., was discarded. The streptomycin-Orange II cake was partially dried on a Buechner funnel and was then divided into a number of portions from which the streptomycin was recovered, as desribed below as well as in Examples 1 to 11.

Fifty grams of the wet streptomycin-Orange II cake was suspended in 150 ml. of methanol, containing triethylamine sulfate. The insoluble streptomycin sulfate and "supercel" were filtered from the soluble triethylamine-Orange II. The streptomycin sulfate was dissolved in water, filtered from the "supercel" and dried: step-yield 82%; the dried material when assayed against the Food and Drug Administration working standard gave an average potency of 510 mcg./mg. by the B. subtilis agar plate and the E. coli turbidimetric methods.

Example 2

Fifty grams of the wet streptomycin-Orange II cake, obtained as described in Example 1, was suspended in 200 ml. of 1:1 acetone-water mixture and treated with a solution of triethylamine sulfate. Four volumes of acetone was added and the precipitated streptomycin sulfate and "supercel" were separated from the solution by decantation. The gummy streptomycin sulfate was re-dissolved in water, filtered from the "supercel" and dried; the dried material when assayed against the Food and Drug Administration working standard gave an average potency of 510 mcg./mg. by the B. subtilis agar plate and the E. coli turbidimetric methods.

Example 3

Fifty grams of the wet streptomycin-Orange II cake, obtained as described in Example 1, was dissolved in 50 ml. of "methyl cellosolve," filtered and treated with a solution of triethylamine sulfate. The precipitated streptomycin sulfate was filtered and dried; the dried material when assayed against the Food and Drug Administration working standard gave an average potency of 510 mcg./mg. by the B. subtilis agar plate and the E. coli turbidimetric methods.

Example 4

Fifty grams of the wet streptomycin-Orange II cake, obtained as described in Example 1, was suspended in 150 ml. of methanol, containing dimethylaniline sulfate. The insoluble streptomycin sulfate and "supercel" were filtered from the soluble dimethylaniline-Orange II. The streptomycin sulfate was dissolved in water, filtered from the "supercel" and dried: the dried material when assayed against the Food and Drug Administration working standard gave an average potency of 510 mcg./mg. by the B. subtilis agar plate and E. coli turbidimetric methods.

Example 5

Fifty grams of the wet streptomycin-Orange II cake, obtained as described in Example 1, was suspended in 150 ml. of methanol, containing ethylamine sulfate. The insoluble streptomycin sulfate and "supercel" were filtered from the soluble ethylamine-Orange II. The streptomycin sulfate was dissolved in water, filtered from the "supercel" and dried: the dried material when assayed against the Food and Drug Administration working standard gave an average potency of 510 mcg./mg. by the B. subtilis agar plate and the E. coli turbidimetric methods.

Example 6

Fifty grams of the wet streptomycin-Orange II cake, obtained as described in Example 1, was suspended in 150 ml. of methanol, containing ethanolamine sulfate. The insoluble streptomycin sulfate and "supercel" were filtered from the soluble ethanolamine-Orange II. The streptomycin sulfate was dissolved in water, filtered from the "supercel" and dried: the dried material when assayed against the Food and Drug Administration working standard gave an average potency of 510 mcg./mg. by the B. subtilis agar plate and the E. coli turbidimetric methods.

Example 7

Fifty grams of the wet streptomycin-Orange II cake, obtained as described in Example 1, was suspended in 150 ml. of methanol, containing triethylamine mucate. The insoluble streptomycin mucate and "supercel" were filtered from the soluble triethylamine-Orange II. The streptomycin mucate was dissolved in water, filtered from the "supercel" and dried: the dried material when assayed against the Food and Drug Administration working standard gave an average potency of 510 mcg./mg. by the B. subtilis agar plate and the E. coli turbidimetric methods.

Example 8

Fifty grams of the wet streptomycin-Orange II cake, obtained as described in Example 1, was suspended in 150 ml. of methanol, containing triethylamine oxalate. The insoluble streptomycin oxalate and "supercel" were filtered from the soluble triethylamine-Orange II. The streptomycin oxalate was dissolved in water, filtered from the "supercel" and dried: the dried material when assayed against the Food and Drug Administration working standard gave an average potency of 510 mcg./mg. by the B. subtilis agar plate and the E. coli turbidimetric methods.

Example 9

Fifty grams of the wet streptomycin-Orange II cake, obtained as described in Example 1, was suspended in 150 ml. of methanol, containing triethylamine tartrate. The insoluble streptomycin tartrate and "supercel" were filtered from the soluble triethylamine-Orange II. The streptomycin tartrate was dissolved in water, filtered from the "supercel" and dried: the dried material when assayed against the Food and Drug Administration working standard gave an average potency of 510 mcg./mg. by the B. subtilis agar plate and the E. coli turbidimetric methods.

Example 10

Fifty grams of the wet streptomycin-Orange II cake, obtained as described in Example 1, was suspended in 150 ml. of methanol, containing quinoline phosphate. The insoluble streptomycin phosphate and "supercel" were filtered from the soluble quinoline-Orange II. The streptomycin phosphate was dissolved in water, filtered from the "supercel" and dried: the dried material when assayed against the Food and Drug Administration working standard gave an average potency of 510 mcg./mg. by the *B. subtilis* agar plate and the *E. coli* turbidimetric methods.

*Example 11*

Fifty grams of the wet streptomycin-Orange II cake, obtained as described in Example 1, was suspended in 150 ml. of methanol, containing triethylamine citrate. The insoluble streptomycin citrate and "supercel" were filtered from the soluble triethylamine-Orange II. The streptomycin citrate was dissolved in water, filtered from the "supercel" and dried: the dried material when assayed against the Food and Drug Administration working standard gave an average potency of 510 mcg./mg. by the *B. subtilis* agar plate and the *E. coli* turbidimetric methods.

The invention claimed is:

1. In a process for the purification and recovery of streptomycin, the steps of mixing a crude streptomycin-Orange II salt with a solvent of the group consisting of acetone, methanol, propanol and ethylene glycol monomethyl ether reacting said mixture with an amine salt selected from the group consisting of the sulfates, phosphates, oxalates, citrates, mucates and tartrates of dimethylaniline, diethylaniline, ethylamine, triethylamine, quinoline, pyridine and ethanolamine, whereby the corresponding acid salt of streptomycin is precipitated, and separating said insoluble salt of streptomycin from the resulting solution of the corresponding amine salt of Orange II.

2. A process as claimed in claim 1, wherein the solvent employed is methanol.

3. A process as claimed in claim 1, wherein the amine salt employed is a salt of triethylamine.

4. A process as claimed in claim 1, wherein the amine salt employed is a sulfate.

5. A process as claimed in claim 1, wherein the amine salt employed is a citrate.

6. A process as claimed in claim 1, wherein the amine salt employed is a tartrate.

7. A process as claimed in claim 1, wherein the solvent employed contains water.

PETER P. REGNA.
ISAIAH A. SOLOMONS, III.

REFERENCES CITED

The following references are of record in the file of this patent:

UNITED STATES PATENTS

| Number | Name | Date |
|---|---|---|
| 2,022,678 | Kritchevsky et al. | Dec. 3, 1935 |
| 2,446,102 | Peck | July 27, 1948 |
| 2,462,175 | Folkers | Feb. 22, 1949 |
| 2,501,014 | Wintersteiner et al. | Mar. 21, 1950 |

OTHER REFERENCES

Peck et al., Jour. Amer. Chem. Soc., vol. 68, pp. 772–776.

Kuehl, Jour. Amer. Chem. Soc., vol. 68, pp. 1460–1462, Aug. 1946.

Ephraim, "Inorganic Chemistry," 4th edition (1943), page 577, 1 page.

Fried et al., Science, vol. 101 (1945), pages 614–615, 2 pages.

Kuehl et al., Science, vol. 102 (1945), pages 34–35, 2 pages.

Carter et al., J. Biol. Chem., vol. 160 (1945), pages 338–339, 2 pages.